United States Patent [19]
Dadez

[11] Patent Number: 6,026,734
[45] Date of Patent: Feb. 22, 2000

[54] FOOD ROASTER WITH BASTING RECEPTACLE

[76] Inventor: Jaime E. Dadez, 749 1/2 W. Pleasant St., Freeport, Ill. 61032

[21] Appl. No.: 09/040,030

[22] Filed: Mar. 17, 1998

[51] Int. Cl.⁷ .................................................. A47J 37/00
[52] U.S. Cl. ............................... 99/345; 99/346; 99/347; 99/446
[58] Field of Search .............................. 99/345, 346, 347, 99/400, 444, 446

[56] References Cited

U.S. PATENT DOCUMENTS

| | | | |
|---|---|---|---|
| 1,755,800 | 4/1930 | Tollagsen | 99/347 |
| 4,942,047 | 7/1990 | Buckholz, Jr. et al. | 426/302 |

FOREIGN PATENT DOCUMENTS

| | | | |
|---|---|---|---|
| 1454147 | 1/1969 | Netherlands | 99/347 |
| 199939 | 7/1923 | United Kingdom | 99/345 |

*Primary Examiner*—Milton Cano
*Assistant Examiner*—Hao Mai
*Attorney, Agent, or Firm*—Russell D. Slifer

[57] ABSTRACT

A food roaster is been described which includes a base plate and a cover. The cover includes a basting receptacle which allows in situ basting during a roasting operation. The roaster uses gravity to direct a baste material from the basting receptacle through a hole, or via, and into an interior of the cover. The basting dripper feature is provided to direct the baste material onto food, such as garlic, located on the base plate. The present invention, therefore, allows a solid baste material such as butter, or a liquid baste material such as oil to be placed in the receptacle during a roasting operation for basting without removing the cover.

12 Claims, 8 Drawing Sheets

FOOD ROASTER WITH BASTING RECEPTACLE

TECHNICAL FIELD OF THE INVENTION

The present invention relates generally to food roasters, and in particular to a garlic roaster with a basting receptacle.

BACKGROUND OF THE INVENTION

The roasting of garlic is often performed to provide seasoning for cooking, or the preparation of spreads for food such as bread. The roasting operation is performed at relatively high temperatures and often includes the step of basting the garlic. When baked, garlic mellows and softens. The roasted garlic takes on a slightly sweet taste and spreads like butter.

Figure 1:
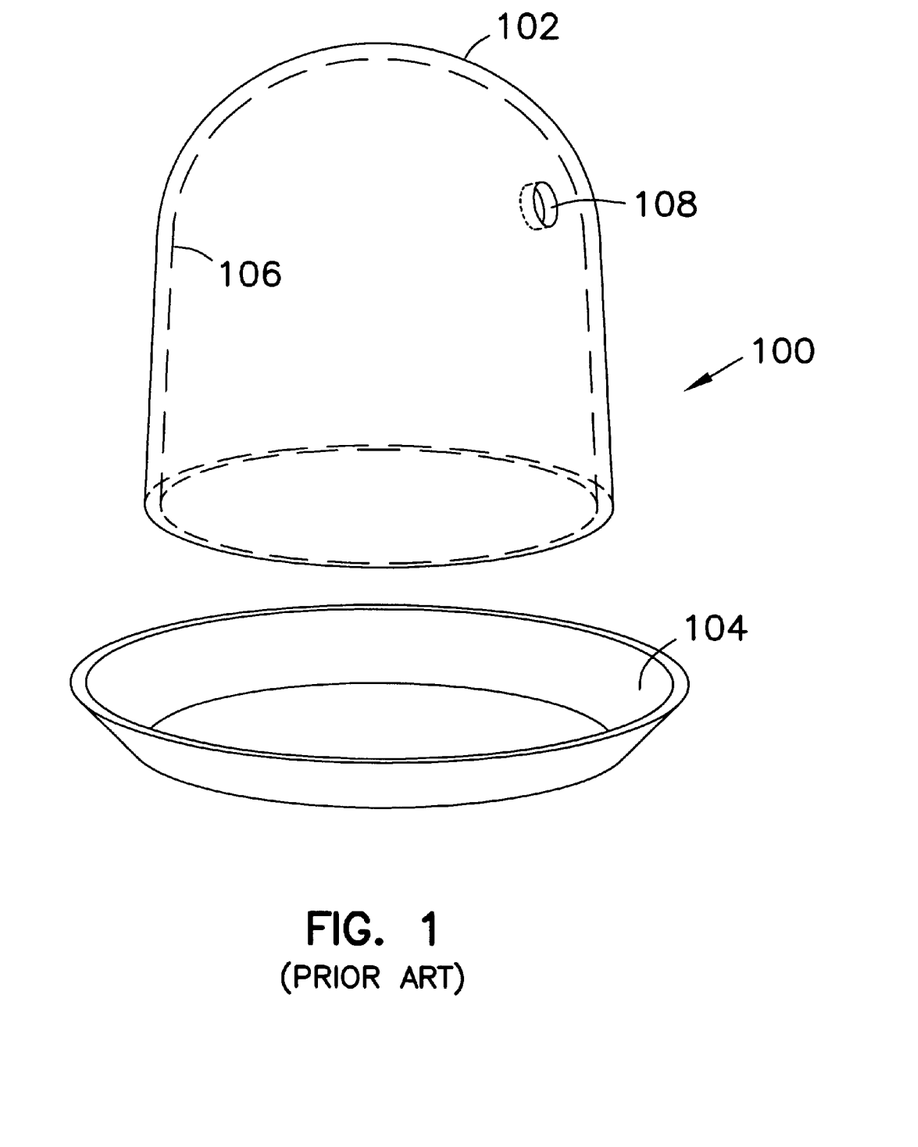
FIG. 1 is a perspective view of a prior art roaster.

Commercially available garlic roasters do not allow for easy basting of garlic during the roasting process. A typical garlic roaster 100, as illustrated in FIG. 1, includes a cover 102 which is placed over bottom plate 104. The cover has a hollow interior 106 and an optional vent hole 108. To roast a clove of garlic, the clove is placed on the bottom plate and covered with cover 102. The roaster is then placed in an oven. The garlic can be basted with a baste such as olive oil or butter. To accomplish this basting, the garlic must be basted prior to heating, or the cover 102 must be removed during the roasting process. Neither of these options is ideal. The garlic is preferably basted while warm. The roasting operation, however, must be interrupted and the hot cover removed to accomplish a basting operation while the garlic is warm.

For the reasons stated above, and for other reasons stated below which will become apparent to those skilled in the art upon reading and understanding the present specification, there is a need in the art for a garlic roaster which allows garlic to be basted while remaining covered during the roasting operation.

SUMMARY OF THE INVENTION

The above mentioned problems with food roasters and other problems are addressed by the present invention and which will be understood by reading and studying the following specification. A food roaster is described which has a basting receptacle.

In particular, the present invention describes a food roaster comprising a base plate having a top surface, and a cover having an interior region, a top region and a bottom. The cover comprises a basting receptacle located at the top region of the cover, a basting hole extending from the basting receptacle into the interior region of the cover, and a basting dripper located on an interior surface of the cover for directing a basting material onto the base plate when the cover is positioned over the base plate.

In an alternate embodiment, a food roaster is described which comprises a circular base plate, a cover having a circular bottom sized to fit onto the base plate, and a basting receptacle located on a top region of the cover and having an upwardly extending interior region adapted to receive a baste material. A basting via is provided which extends from the basting receptacle through a wall of the cover and into any interior region of the cover. A basting dripper is located in the interior region of the cover and adjacent to the via for directing a liquid baste material onto the base plate.

In yet another embodiment, a method of roasting food, such as garlic, is described. The method comprises the steps of placing the food on a base plate of a roaster, placing a cover over the base plate in the food, heating the base plate, cover, and food, and in situ basting the heated food with a baste material via a basting receptacle located on top of the cover.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present invention is defined only by the appended claims.

Figure 2:
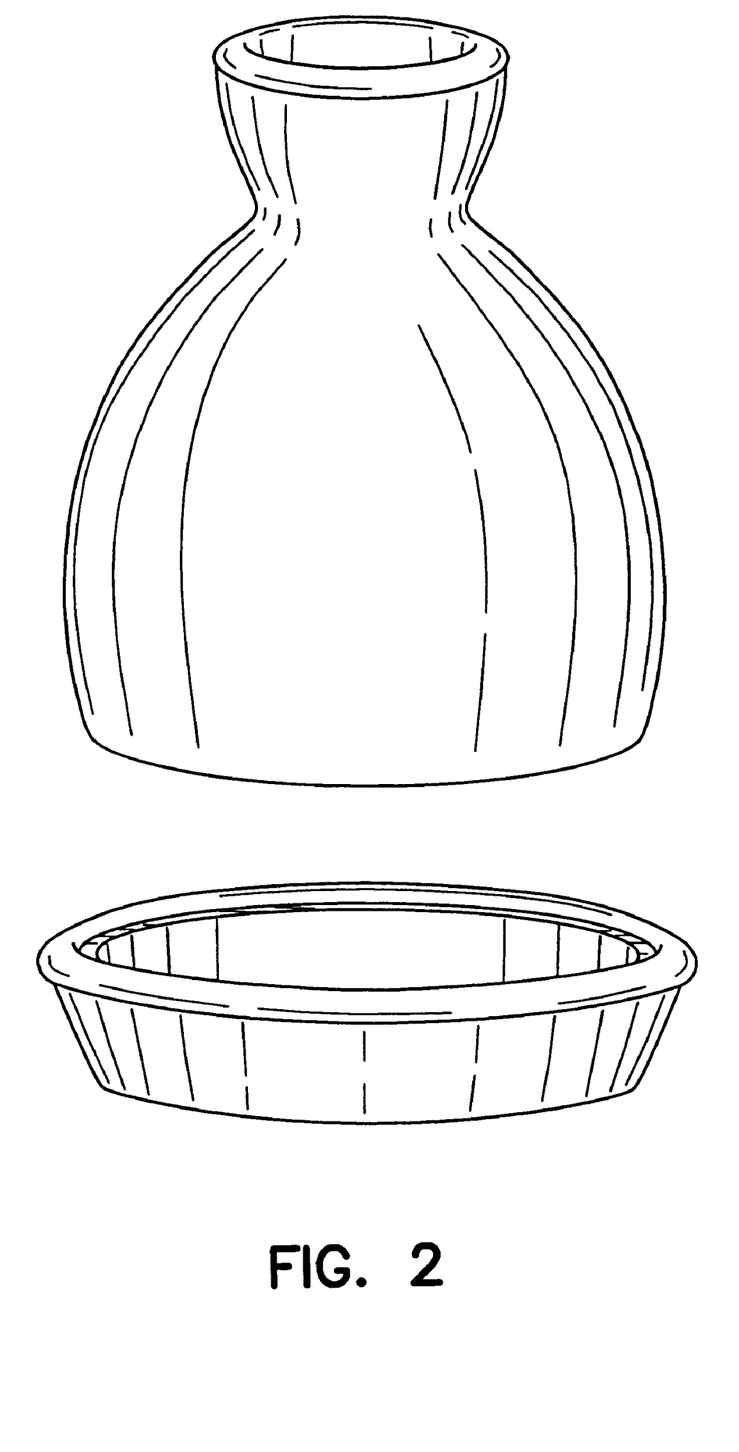
FIG. 2 is a perspective view of a roaster of the present invention.

A prospective view of an assembled food roaster of the present invention is provided in FIG. 2. The roaster 120 includes a cover 122 and a base plate 124. A basting bowl, or receptacle, 126 is provided in the cover for receiving a basting material such as butter, or oil, as further described below. The base plate is sized to receive the cover 122, such that garlic, onion, or the like, can be placed in the center of the base plate and covered during a roasting operation.

Figure 3A:
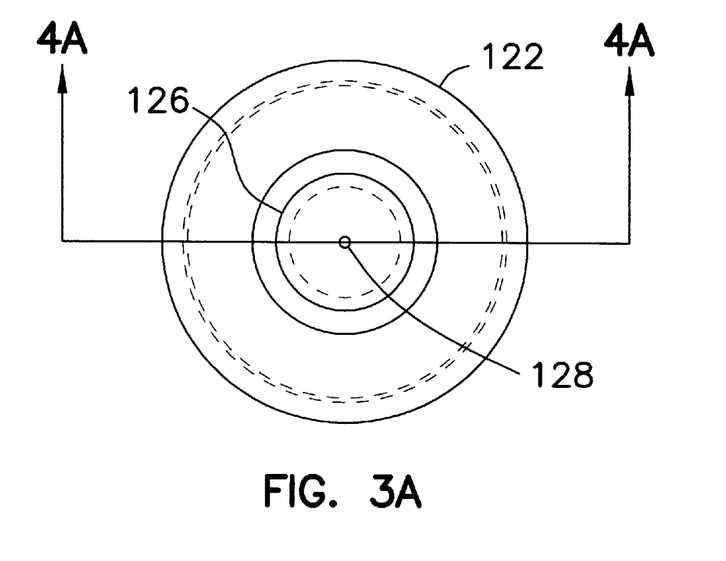
FIG. 3A is a top view of a cover of the roaster of FIG. 2.
Figure 4A:
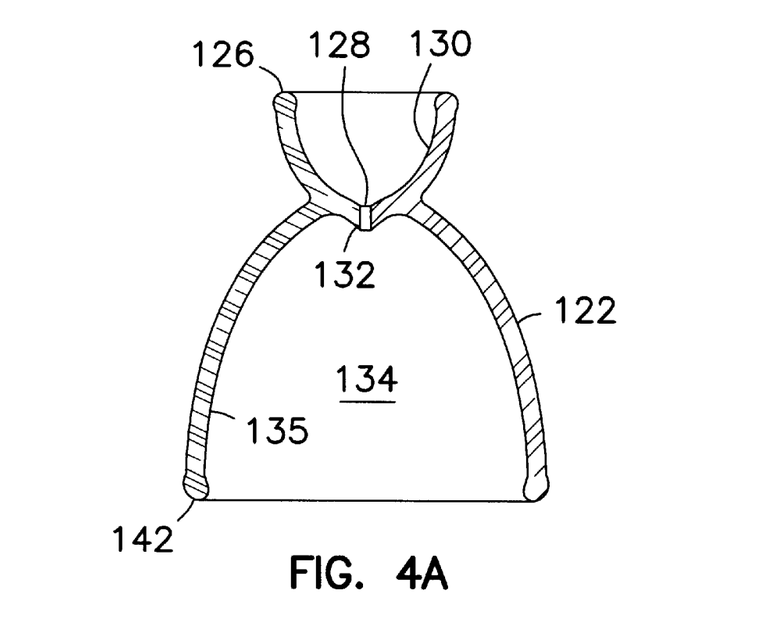
FIG. 4A is a cross section view of the cover of FIG. 3A.

FIG. 3A illustrates a top view of cover 122. A basting hole 128 connects the basting bowl to an interior region of the cover. The basting hole can more clearly be seen by reference to the cross section of cover 122, as shown in FIG. 4A. The basting bowl 126 includes an upwardly extending receiving area 130 for receiving a basting material. The basting hole 128 extends into the interior region of the cover 122. A basting dripper 132 is provided to direct the basting material onto the base plate where garlic which is being roasted. In the absence of the basting dripper, the basting material would flow down and interior surface 135 of the cover, thus missing the food being roasted. The basting dripper can be any design which directs the basting material to drip onto food being roasted. The embodiment illustrated in FIG. 4A has a 360-degree ridge which surrounds the bottom of the basting hole. Additional embodiments are described in detail below.

Figure 3B:
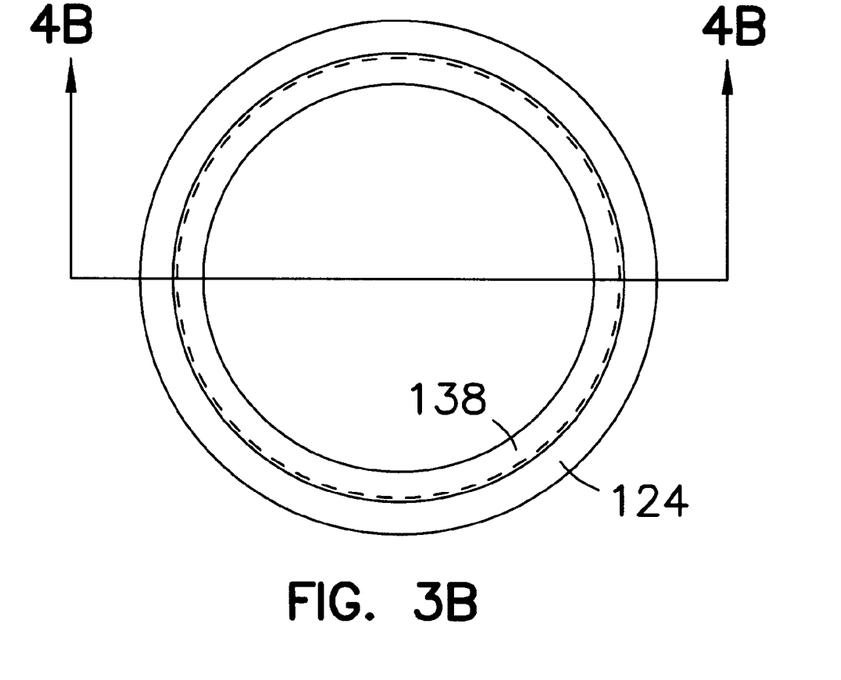
FIG. 3B is a top view of a base plate of the roaster of FIG. 2.
Figure 4B:
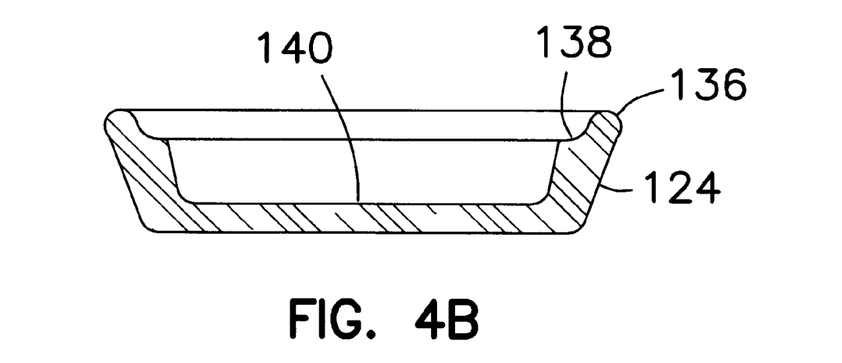
FIG. 4B is a cross section view of the base plate of FIG. 3B.
Figure 4C:
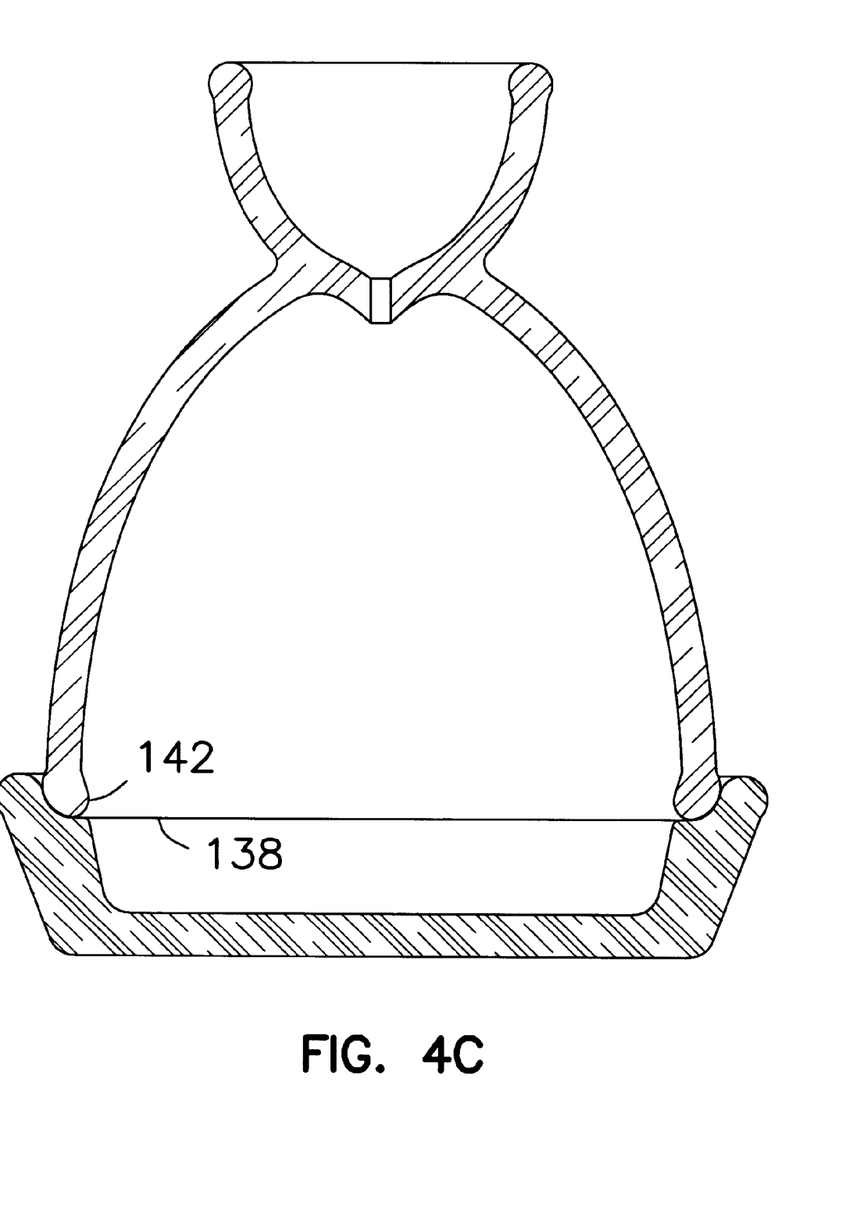
FIG. 4C is a cross section of the cover and base plate of the roaster of FIG. 2.

FIG. 3B illustrates a top view of the base plate 124, while FIG. 4B illustrates a cross section of the base plate. The base plate includes an outer lip region 136 and a plateau region 138. The plateau region has a diameter sufficient to receive the bottom of the cover. That is, the bottom 142 of the cover is sized to rest upon the plateau region during the roasting operation, see FIG. 4C. The base plate includes a center area 140 on which the food being roasted, i.e. garlic, is placed. It will be appreciated by those skilled in the art that the center area and the bottom of the cover are positioned on separate horizontal planes when assembled, as shown in FIG. 4C. Basting material, therefore, cannot accumulate at the juncture between the cover and base plate.

In operation, a clove of garlic is prepared by slicing off a top of the bulb of garlic and removing a part of its skin. The prepared garlic is placed substantially in the center of the base plate and the cover is placed over the base plate. At this time, basting material in a solid form, such as a scoop of butter, can be placed in the receiving area of the basting receptacle 126. The garlic roaster is then placed in an oven for roasting. As the garlic roaster increases in temperature, the basting material is melted and passes through the basting hole 128. When the basting material reaches the basting dripper, the liquid basting material drips from the cover onto the garlic being roasted. This method both allows the garlic to be warm during the basting operation and prevents the removal of the cover while hot. Further, it will be appreciated by those skilled in the art, that the basting operation is extended over a larger period of time, allowing the baste to be absorbed by the food, thereby increasing the effect of the basting material. Alternately, when a liquid basting material such as olive oil is desired, the olive oil can be poured into the basting bowl 126 during the roasting operation without removing the cover. The basting dripper operates in the same manner, as described above, to direct the basting material which passes through the basting hole onto the garlic being roasted.

The vent hole 108, illustrated in FIG. 1 of the prior art, is intended to allow moisture to escape from the interior of the garlic roaster cover 102. Clearly, the vent hole does not allow for the in situ basting of garlic. The basting hole of the present invention, however, serves a dual purpose. That is, basting material passes through the basting hole during a basting operation, and allows moisture to escape from the interior of the garlic roaster cover.

The garlic roaster cover 122 and base plate 124 can be fabricated from numerous different materials, including but not limited to clay, ceramic, glass, terracotta, or other materials suitable for roasting temperatures. Further, portions of the garlic roaster such as a top surface of the base plate 124 and receiving area 130 of the basting bowl 126 can be glazed to allow for easy cleaning. If desired, additional vent holes can be included with the present invention to further facilitate moisture ventilation.

Although one embodiment of the basting dripper has been described, numerous different embodiments of basting drippers are contemplated for directing a basting material onto the garlic positioned inside of the garlic roaster. The basting dripper 122 can be described as a generally circumferential feature which surrounds the basting hole. This feature, however, does not have to be 360 degrees around the basting hole. Other drippers can be radially extending from the basting hole, or discrete features placed around the hole to direct a liquid baste toward a food being roasted. Some embodiments of circumferential drippers with alternate basting holes are illustrated and described with reference to FIGS. 5–7.

Figure 5:
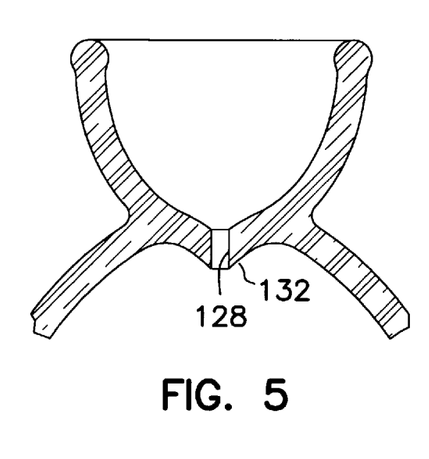
FIG. 5 is an enlarged cross section view of one embodiment of a basting dripper.
Figure 6:
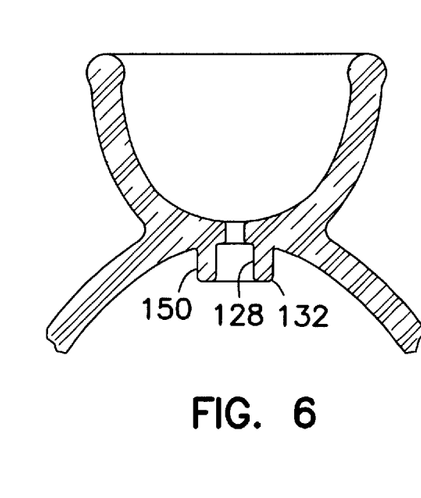
FIG. 6 is an enlarged cross section view of an alternate embodiment of a basting dripper.
Figure 7:
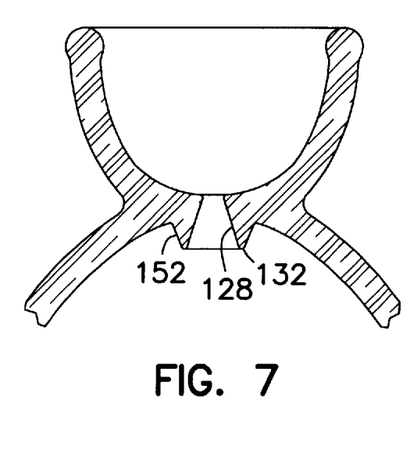
FIG. 7 is an enlarged cross section view of an alternate embodiment of a basting dripper.

FIG. 5 is an enlarged view of dripper 132 of FIG. 2. The dripper is configured as a generally cone-shaped ridge extending into the interior of the cover. The ridge is symmetrical about hole 128. The shape of the ridge is not critical, provided the function of creating a feature for directing and dripping a baste is performed. Similarly, the shape of hole 128 can be varied. For example, a tapered hole is illustrated in FIG. 7, and a stepped hole having two diameters is illustrated in FIG. 6. Further, the dripper of FIG. 6 has a straight outside wall 150. The dripper of FIG. 7 is formed with an outside wall 152 which has a greater angle than that of FIG. 5. Again, the dripper does not have to be continuous around hole 128. The design of a dripper is limited only by one's imagination, and multiple dripper designs are contemplated herein.

Figure 8A:
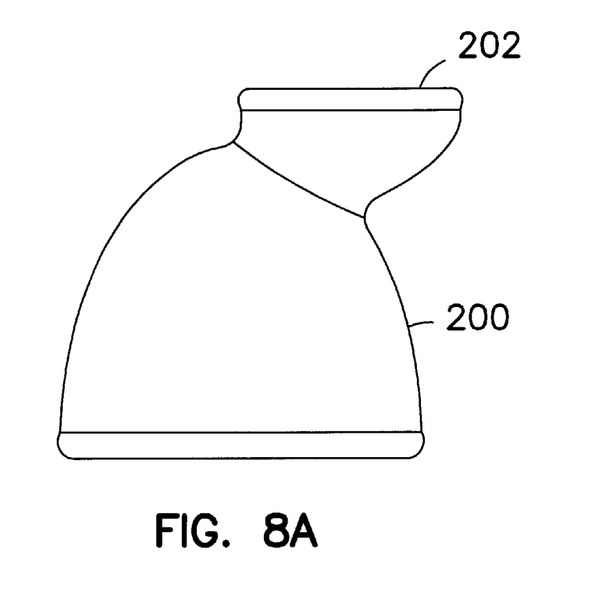
FIG. 8A is a side view of an alternate embodiment of a cover of the roaster.
Figure 8B:
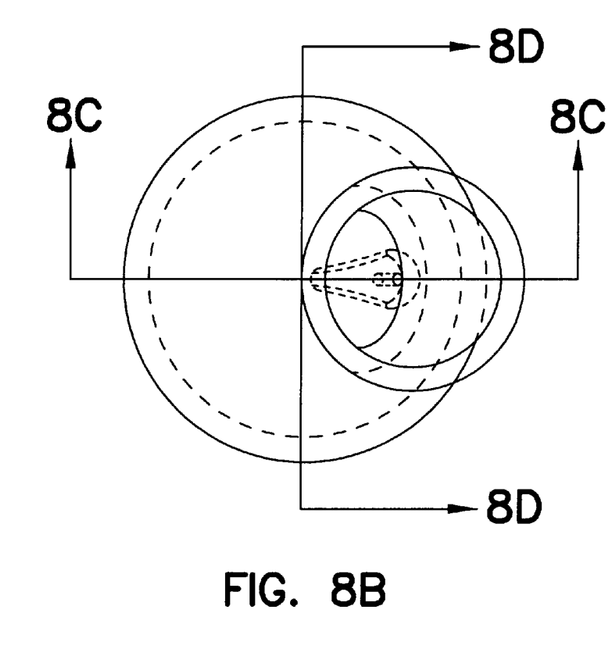
FIG. 8B is a top view of a cover of the roaster of FIG. 8A.
Figure 8C:
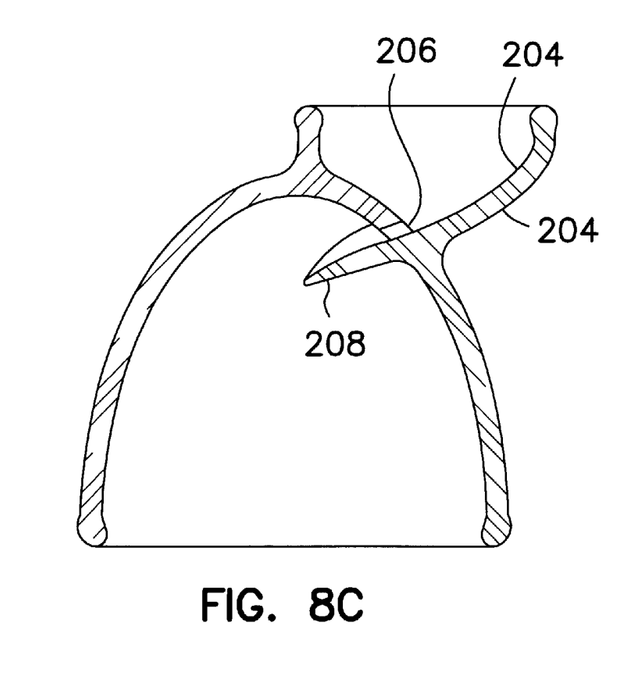
FIG. 8C is a cross section view of the cover of FIG. 8A.
Figure 8D:
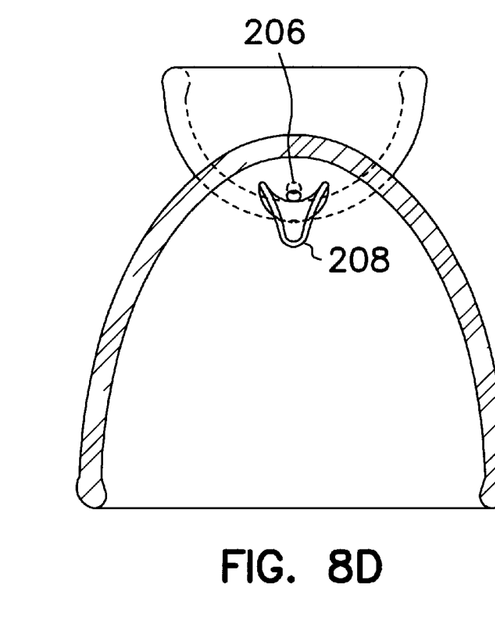
FIG. 8D is a cross section view of the cover of FIG. 8A.

While the basting receptacle described above is aligned on the same vertical axis as the cover, FIG. 8A illustrates an alternate embodiment of a food roaster cover 200 having an offset basting receptacle 202. FIG. 8B is a top view of the cover 200. It is clear that a vertical axis of the basting receptacle and a vertical axis of the cover are laterally offset. Referring to FIG. 8C, a cross-section view of cover 200 shows a receiving area 204 of basting receptacle 202, the basting hole 206, and a baste dripper 208. The basting hole extends into the interior of the cover such that baste runs through the hole, down the baste dripper and onto food located on base plate 124. The dripper is formed as a spout, as illustrated in FIG. 8D. It will be appreciated by those skilled in the art that other shapes in locations of the basting receptacle, based hole and dripper can be provided without departing from the present invention.

CONCLUSION

A food roaster has been described which includes a base plate and a cover. The cover includes a basting receptacle which allows in situ basting during a roasting operation. The roaster uses gravity to direct a baste material from the basting receptacle through a hole, or via, and into an interior of the cover. The basting dripper feature is provided to direct the baste material onto food located on the base plate. The present invention, therefore, allows a solid baste material such as butter, or a liquid baste material such as oil to be placed in the receptacle during a roasting operation for basting without removing the cover. Several example embodiments of the basting dripper feature have been described, however, it is not intended to be an exhaustive description of all possible embodiments. Further, two embodiments of the cover have been described. One embodiment has an axis of the receptacle aligned with an axis of the cover, while the second embodiment has an axis of the receptacle offset from the axis of the cover.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A food roaster comprising:

a base plate having a top surface; and a cover having an interior region, a top region and a bottom, the cover comprises, a basting receptacle integrally formed with the cover and located at the top region of the cover, a basting hole extending from the basting receptacle into the interior region of the cover, and a basting dripper integrally formed with the cover and located on an interior surface of the cover for directing a basting material onto the base plate when the cover is positioned over the base plate, wherein the basting dripper comprises a ridge surrounding the basting hole and downwardly extending from the interior surface of the cover.

2. The food roaster of claim 1 wherein the cover is bell-shaped.

3. The food roaster of claim 1 wherein the basting receptacle has a bowl-shaped interior surface.

4. The food roaster of claim 1 wherein the basting hole has a tapered interior surface.

5. The food roaster of claim 1 wherein the basting hole has a stepped interior diameter.

6. The food roaster of claim 1 wherein the base plate and the cover are fabricated from clay.

7. The food roaster of claim 1 wherein the cover includes at least one ventilation hole.

8. The food roaster of claim 1 wherein the base plate has a center region for positioning food on a first horizontal plane, and a support for positioning the bottom of the cover on a second horizontal plane which is above the first horizontal plane when the cover is placed over the base plate.

9. The food roaster of claim 8 wherein the support is a ridge integrally formed with the base plate.

10. The food roaster of claim 1 wherein a vertical axis of the basting receptacle is horizontally offset from a vertical axis of the cover.

11. A garlic roaster comprising:

a circular base plate;

a cover having a circular bottom size to fit onto the base plate, the cover comprising:

a basting receptacle integrally formed with the cover and located on a top region of the cover and having an upwardly extending interior region adapted to receive a baste material;

a basting via extending from the basting receptacle through a wall of the cover and into any interior region of the cover; and a basting dripper integrally formed with the cover and located in the interior region of the cover and adjacent to the via for directing a liquid baste material onto the base plate, wherein the basting dripper comprises a ridge surrounding the basting hole and downwardly extending from the interior surface of the cover.

12. The garlic roaster of claim 11 wherein a vertical axis of the basting receptacle is horizontally offset from a vertical axis of the cover.

* * * * *